United States Patent [19]

Mosier

[11] Patent Number: 4,583,094
[45] Date of Patent: Apr. 15, 1986

[54] SOLID STATE ATTITUDE DIRECTOR INDICATOR

[75] Inventor: Donald E. Mosier, Cedar Rapids, Iowa

[73] Assignee: Rockwell International Corporation, El Segundo, Calif.

[21] Appl. No.: 489,668

[22] Filed: Apr. 28, 1983

[51] Int. Cl.$^4$ .................. G08B 23/00; G01C 21/00; G01C 23/00

[52] U.S. Cl. ................... 340/975; 73/178 R; 340/967; 340/971; 340/973; 340/974; 340/976; 340/979

[58] Field of Search ............... 340/784, 967, 974, 975, 340/753, 758, 765, 766, 773, 771, 727, 754, 973, 976, 977, 978, 979, 971; 350/330; 73/178 R, 178 H, 178 T; 434/35, 38, 43, 47, 49, 51; 33/328

[56] References Cited

U.S. PATENT DOCUMENTS

| Re. 31,872 | 4/1985 | Cohen | 340/754 |
|---|---|---|---|
| 3,337,845 | 8/1967 | Hart | 340/975 |
| 3,711,826 | 1/1973 | La Russa | 340/974 |
| 4,127,794 | 11/1978 | Frankland | 340/753 |
| 4,198,810 | 3/1980 | Fahrenschon | 340/765 |
| 4,283,705 | 8/1981 | James et al. | 340/975 |
| 4,371,870 | 2/1983 | Biferno | 340/784 |
| 4,410,887 | 10/1983 | Stolov et al. | 340/784 |
| 4,463,355 | 7/1984 | Schultz et al. | 73/178 R |
| 4,484,189 | 10/1984 | Dettmer | 340/974 |

Primary Examiner—James J. Groody
Assistant Examiner—Brent A. Swarthout
Attorney, Agent, or Firm—Robert C. Mayes; George A. Montanye; H. Fredrick Hamann

[57] ABSTRACT

A solid state attitude and director indicator (ADI) is disclosed utilizing liquid crystal display technology to represent attitude of a vehicle in two axes. A visual representation of attitude changes is provided on the liquid crystal display as well as numeric data, in a preferred embodiment. Additionally, glideslope, localizer, and approach speed may be displayed as well as heading and command bar information.

19 Claims, 3 Drawing Figures

SOLID STATE ATTITUDE DIRECTOR INDICATOR

BACKGROUND OF THE INVENTION

This invention relates to electronics in general and more particularly to liquid crystal displays.

The need for artificial horizons and other attitude indicating instruments in aviation has long been recognized. Under conditions of reduced visibility such as fog or during nighttime flying, the Federal Aviation Administration requires that the flight must be conducted in accordance with instrument flight rules (IFR). Even under visual flight rules (VFR), many pilots find an attitude indicator helpful. An attitude indicator shows the relative pitch of the nose of the aircraft, up or down relative to the axis of motion of the aircraft, and roll of the aircraft around its axis of motion so that the pilot may readily coordinate turns and determine the relative attitude of the aircraft relative to the surface of the earth and the axis of motion.

Another helpful instrument is a flight director which provides commands informing the pilot how to position the aircraft attitude in order to achieve some prescribed flight activity, for example capturing an instrument landing system (ILS) beam. The combination of these two instruments is termed attitude director indicator, or "ADI".

Another helpful instrument in virtually all modern aircraft is the heading indicator, formerly constructed with a magnetic compass but more recently being supplemented by gyrocompasses. Other variables such as speed of the aircraft, VHF omnirange information or "VOR", and instrument landing system or "ILS" information such as localizer deviation, glideslope and approach speed to an ILS runway may also be shown.

Typically, a combined attitude director (ADI) showing attitude and ILS information was used in conjunction with a course indicator showing heading and VOR information to provide a relatively complete instrumentation system for an aircraft. These devices, however, utilized a relatively large number of mechanical devices such as synchros, relays, and complex gearing structures to provide a mechanical indicator for the pilot having as many as ten or more moving indicators displayed on an indicator as small as 4×4 inches. These displays necessitated extreme measures in mechanical engineering to place the gearing structures and motors required within the space requirement for avionics displays as well as exacted a relatively severe weight penalty in the aircraft.

The advent of the cathode ray tube in avionics displays provided for simplified mechanical structure and enabled a significant increase in flexibility for the avionics display designer in allowing both numeric data and analog displays to be presented on the cathode ray tube. The CRT, however, requires a relatively deep assembly to attain precision deflection and requires a relatively heavy power supply to provide the voltages necessary to drive the CRT.

The use of liquid crystal displays in avionics is known for presenting numeric data such as frequencies or heading information as well as an analog display such as a bar graph indicating fuel levels. The liquid crystal display technology, however, is limited to producing images that cannot be physically moved over the display, in contrast to CRT technology or the mechanical motion displays, since the segments of the liquid crystal are permanently deposited on the surface of the glass. Therefore, the industry has heretofore been unable to adopt the advantages of liquid crystal displays such as relative low cost, ease of manufacture, long mean-times-before failure, and high readability into an avionics display unit capable of displaying relative motions.

SUMMARY AND BRIEF DESCRIPTION OF THE INVENTION

Accordingly, it is an object of the present invention to provide a solid state liquid crystal display capable of displaying relative motions about two axes.

Another object of the present invention is to provide a display capable of showing motion in two axes having a reduced cost and an increased mean-time-before failure.

Briefly, and in accordance with the present invention, a solid state indicator for displaying attitude in two axes of motion comprises a liquid crystal display having a first plurality of selectively activated segments formed in a first segmented circle, and a second plurality of segments formed in a concentric configuration relative to the first segmented circle to form a second circle circumjacent the first.

The two concentric circles are operated in a manner such that an arc is defined by activating the segments within a section of the first circle and activating the non-contiguous portions of the circumjacent circle. Therefore, the activated inner segments define a portion of a complete circle and the outer circle is activated to form an arc completing the circle. In this manner, a complete circle is always displayed during operation of the display and by additionally providing a horizontal reference segment in or near the center of the concentric segmented circles, the roll information is readily ascertained by glancing at the display.

Additionally, by utilizing two distinct colors, one for each of the circles, the demarcation between the first inner arc and the second outer arc is readily perceived visually.

Pitch information is displayed in one embodiment by utilizing a plurality of segmented vertical bars being selectively activated as a function of pitch and also having various coloration as is shown and described herein.

In an alternative embodiment, the pitch angle is related to the number of degrees of arc of each of the segmented circle regions such that when the nose is up, for example, the arc representing "sky" extends farther than 180° by a number of degrees related to the angle of pitch, and conversely, when the nose is down, the arc representing "sky" is shorter than 180°, again as a function of the angle of pitch.

The inner arc, representing the "sky" in one embodiment, is colored a brilliant blue and the outer concentric arc is colored a readily perceived brown. Thus, when the aircraft is in an absolutely normal flight attitude, the inner segmented circle is activated to display a 180° arc concave downward, and the outer circle is activated for 180° concave upward to form a complete 360° circle having the upper portion blue and the lower portion brown.

In preferred embodiments, the display additionally contains a third segmented circle contiguous to the first and second circles for displaying command information to the pilot so that the correct direction required to maintain the desired attitude of the aircraft is readily perceived by the pilot. These command segments are placed either inside the concentric rings as is shown in the embodiment in FIG. 3, or may be placed outside the concentric ring configuration as is shown in the embodiment in FIGS. 1 and 2.

Additionally, displays contain in alternative embodiments various annunciations such as VOR, decision heighth (DH), localizer (LOC), and heading (HDG). Numeric information is displayed in alternative embodiments in various other regions of the display other than the portion of the display occupied by the concentric segmented circles.

The novel features believed to be characteristic of the invention are set forth in the appended claims. The invention itself, however, as well as other objects and advantages hereof, may best be understood by reference to the following detailed description of illustrative embodiments when read in conjunction with the accompanying drawings in which:

DETAILED DESCRIPTION OF THE DRAWINGS

Figure 1:
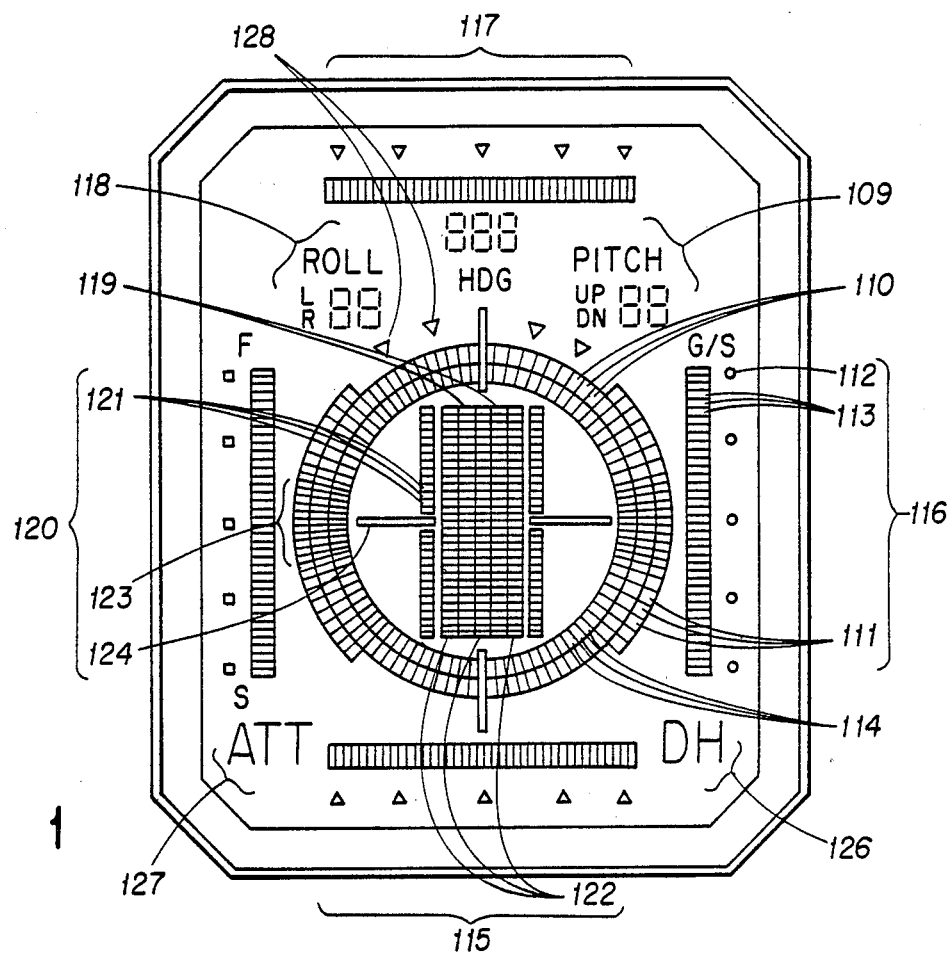
FIG. 1 is a frontal view of a non-activated solid state liquid crystal display in accordance with the present invention showing all of the segments of the liquid crystal in correct relative positions.

Referring now to FIG. 1, a frontal view of a non-activated solid state liquid crystal display in accordance with the present invention is shown with all of the segments of the liquid crystal display in correct relative positions. The inner concentric ring shown by segments 114 is in close proximity to the outer concentric ring shown by segments 110, and as is shown in FIG. 1, each of the segment demarcations for circle 114 and 110 coincide such that when a portion of circle 110 is activated, the corresponding portion of circle 114 is deactivated and thus causes a precise demarcation between the two circles. All of the segments in circle 110 are formed having a brown appearance when activated and likewise all of the segments in circle 114 are formed having a blue appearance when activated wherein the blue represents sky region and the brown represents the earth region. The horizontal reference segment 124 is provided to enable a ready visual reference to the horizontal position as the segments in the concentric circles tend to rotate around the display. The segments in region 123 are in a closer proximity one to the other for improving resolution of the display in the near normal horizontal flight position. Segments 111 in a third circular configuration provide a command segment capability enabling additional information to be transmitted to the pilot on a continuous basis.

The segments in region 117 provide information to the pilot with respect to heading deviation from a preset course as well as showing numeric heading data. Analog pitch information is shown when the nose of the aircraft is up by segments 119 colored with a blue appearance and, when the nose is down, by segments 122 which are colored brown. The degree of pitch is indicated by the number of segments 119 and 122 activated above or below the horizontal reference segment 124.

Region 120 has an approach speed indicator capable of indicating whether the aircraft is approaching an ILS runway and is capable of indicating a fast or slow relative rate of descent toward the runway. Region 116 is the glideslope indicator capable of indicating height above or below the preferred glideslope, utilizing the reference segments, such as segment 112, and indicating with the indicator segments 113. Region 115 is for indicating localizer information on an ILS approach, with the deviation left or right from the correct entry position. Additionally, an attitude warning alert 127 indicating an improper aircraft attitude is provided as well as a decision height warning indicator 126 for indicating the closest position to the runway the aircraft may be flown in an instrument flight rules situation without visual contact with the runway.

Figure 2:
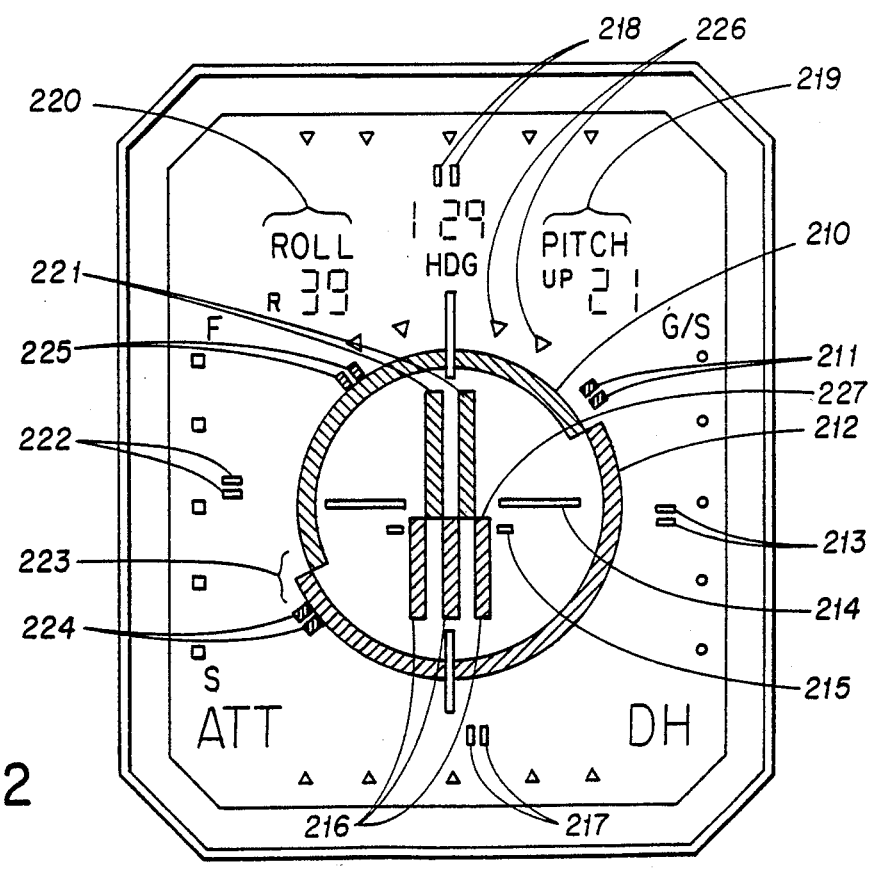
FIG. 2 is an activated version of the display shown in FIG. 1 having an indicated roll to the right of 39° and a pitch up of 21° wherein the visual perception of roll and pitch are clearly shown.

Segments 121 indicate command information to the pilot for pitch correction as is shown in FIG. 2.

Bank angle index markers 128 provide an additional scale against which roll angle may be measured.

Referring now to FIG. 2, an activated version of the display shown in FIG. 1 is shown having an indicated roll to the right of 39° and a pitch up of 21° wherein the visual perception of roll and pitch are clearly shown. The cooperative activation of the concentric rings 212 showing earth, and ring 210 showing sky readily displays a visual representation of the roll attitude of the aircraft. The bank index pointer 225, generated by activating several unused segments of circle 212, moves against the scale 226 to act as an additional roll angle indication in a manner similar to current mechanical or CRT indicators. Additionally, the 39° roll is shown in region 220 for a precise readout in degrees of deviation from the normal attitude. Pitch information is shown both by the segments 221 and by the region 219 relating a pitch up of 21°. The pitch indicator segments 221 and 216 form a junction 227 which is representative of the horizon relative to the nose of the aircraft. As the junction 227 moves downward, the greater number of blue segments 221 indicating sky indicates that the nose of the aircraft is up as is shown in FIG. 2, and conversely as the junction 227 moves up, a greater number of segments 216 activated and showing a brown appearance would indicate that the nose of the aircraft is in a down attitude relative to the surface of the earth. Additionally, the pitch command segments 215 are shown indicating that the pilot should fly the "wings" of the aircraft represented by the horizontal reference segments 214 down to the pitch command segments 215 to return the aircraft to the commanded attitude. Command segments 211, and 224 are for relating correction information to the pilot so that he may readily ascertain at a glance the direction required to turn the aircraft to the commanded attitude. Command segments 215 likewise are for enabling the pilot to ascertain readily from the display the direction to which he must fly the wings of the aircraft represented by segments 214 to turn the aircraft to the commanded pitch attitude.

Region 223 showing the demarcation between the "earth" represented arc 212 and the "sky" represented arc 210 shows how the interrelationship of two arcs visually enables the pilot to ascertain roll information on a real time basis as it actually occurs to the aircraft, without having any moving parts. It is important to note that the cost of a solid state display as is shown in the present invention compared to the cost of the mechanical motion or cathode ray tube displays, will typically be an order of magnitude less. Additionally, a mean-time-before-failure of such a display can be expected to be considerably greater and thus further enhance the usefulness of the present invention.

It should be noted that although the present specification refers to a liquid crystal display, other solid state devices such as light emitting diode matrices and other solid state technologies are also useful, and can readily benefit by using the present invention.

In the presently described embodiment, glideslope information is related by the indicator 213 on a bar graph showing the relative height of an aircraft approaching a runway in an ILS configuration. Additionally, the approach speed of the aircraft is shown by indicator 222 as well as localizer or deviation left or right of the runway by indicator 217. Indicated heading information is shown by indicator 218 and is useful both during flight and on approach to confirm the proper runway has been selected.

Figure 3:
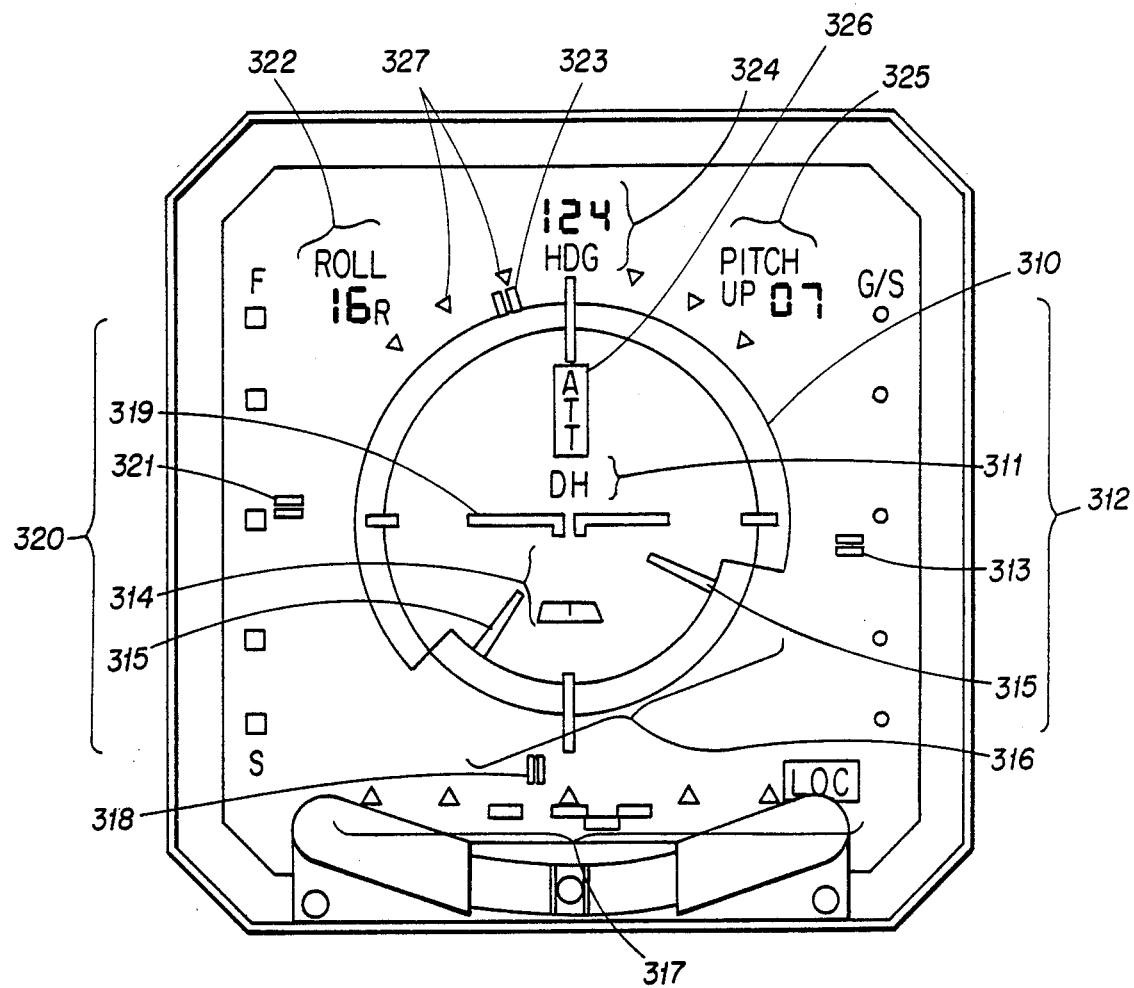
FIG. 3 is an alternative embodiment having concentric rings operative to display both roll and pitch in an integrated manner as well as a rising runway indicator and other ILS and heading information.

Referring now to FIG. 3, an alternative embodiment utilizing the present invention is shown wherein the pitch and roll information are both integrated within the concentric multisegmented circles. In this embodiment, the inner ring 316 is representative of the earth or relative ground position to the aircraft, and ring 310 represents the sky relative to the attitude of the aircraft. Horizontal indicator 319 represents the wings of the aircraft and thus the pitch commands shown by segments 315 indicate to the pilot that the wings of the aircraft, segments 319, should be flown down to normalize pitch and to the left to normalize roll. The bank index pointer 323 moves relatively to scale 327 and additionally indicates deviation from level flight, and the number of degrees of roll shown in region 322 and pitch shown in region 325 enable an accurate reading in degrees of the actual situation of the aircraft. Glideslope height information shown in region 312 indicates the altitude of the aircraft on final approach as a function of the movement of the indicator 313 against the glideslope scale 312. The approach speed is again indicated by the indicator 321 moving along the scale 320 for relating information corresponding to the proper approach speed of the aircraft to the runway. The rising runway indicator 314 is comprised of a multisegmented runway representation which displays the proximity of the aircraft to the runway itself and is particularly useful in Category II low visibility landings and in Category 111 zero visibility landings, as they are defined by the Federal Aviation Administration. The runway indicator 314 may also represent lateral deviation from the runway center line. Once again, optional numeric roll information is shown in region 322 and numeric pitch data is shown at region 325. The heading information at region 324 is shown in the embodiment of FIG. 3 as a particularly useful option.

Localizer information shown at region 317 is useful for indicating whether the aircraft has deviated to the left or right of the runway on approach and the indicator 318 displays the analog situation to the pilot in a readily perceivable manner.

The attitude warning indicator 326 is useful to indicate an unusual aircraft attitude or a detected attitude sensor system failure to the pilot and the decision height indicator 311 is useful in indicating proximity to the runway on Category II landings where the pilot must have visual contact when the indicator 311 is activated or he must apply power and abort the landing attempt.

The integrated configuration of segments 316 and 310 is a useful analog representation of the actual attitude of the aircraft, and with appropriate training, virtually any instrument qualified pilot will find the present invention a valuable primary or backup flight aid and landing tool.

Additionally, information may be included in other regions of the display such as radar altitude, automatic direction finding (ADF) information, very high frequency omnirange (VOR), as well as navigation and distance measuring information (NAV and DME). Similarly, global positioning system information can be displayed as well as VHF Omega or any other navigation system required.

The ease of design of a custom system utilizing the present invention and the resultant low cost combine to make the solid state attitude indicator as described herein a valuable flight assistance tool during both visual flight rules and instrument flight rules flights.

While this invention has been described with reference to various illustrative embodiments, it is not intended that this description be construed in a limiting sense. Various modifications of the illustrative embodiments as well as other embodiments of the invention will be apparent to persons skilled in the art upon reference to this description. For example, the numeric displays provide additional accuracy in alternative embodiments through the addition of more digits; and the inner and outer concentric circles are readily exchanged as is shown by having the sky represented by the outer circle in FIG. 3 and the inner circle in FIG. 2. Additionally, in the embodiment shown in FIG. 3, an additional pitch indicator can be located between the horizontal reference segments 319 to provide an additional aid in pitch determination. It is therefore contemplated that the appended claims will cover any such modifications of embodiments as fall within the true scope of the invention.

I claim:

1. A solid state indicator for displaying relative movement in at least one axis of motion comprising:
   a. a liquid crystal display having a first plurality of selectively activated segments formed in a first segmented circle; and
   b. a second plurality of segments formed in a concentric configuration relative to said first segmented circle to form a second circle circumjacent the first, wherein a contiguous portion of said first plurality of segments, selectively activated, defines an arc on said first segmented circle, the inactive segments in said first plurality corresponding substantially to activated segments of said second plurality, such that a complete circle is cooperatively defined.

2. An indicator as in claim 1 wherein said first plurality of segments is formed having a first color, and said second plurality of segments is formed having a second color.

3. An indicator as in claim 2 wherein said first color is substantially blue in appearance.

4. An indicator as in claim 2 wherein said second color is substantially brown in appearance.

5. An indicator as in claim 1 further comprising a horizontal reference indicator segment.

6. An indicator as in claim 1 further comprising a plurality of segments for indicating attitude correction commands.

7. An indicator as in claim 5 further comprising a plurality of segmented vertical bars for selective activation as a function of pitch angle, thereby displaying attitude in said at least one axis of motion.

8. An indicator as in claim 7 further comprising additional segments for relating numeric pitch data.

9. An indicator as in claim 5 wherein the relationship of said defined arc to said horizontal reference indicator segment is related to roll angle, thereby displaying attitude in said at least one axis of motion.

10. An indicator as in claim 9 further comprising additional segments for relating numeric roll data.

11. For a vehicle having a specified normal attitude directly related to a specified normal movement axis of said vehicle, an attitude indicator comprising:
   a. a liquid crystal display having two concentric multisegmented circles, a first circumjacent the second, and a horizontal reference segment;
   b. means for operating said liquid crystal display such that when a defined arc on said second circle of segments is activated, the inactive segments of said second circle correspond substantially to the activated segments of said first circle, such that a complete circle is cooperatively defined;
   c. a plurality of segmented vertical bars for selective activation as a function of attitude of said vehicle around a lateral axis horizontal to the earth and perpendicular to said normal movement axis; and
   d. the relationship of said defined arc to said horizontal reference segment is a function of attitude of said vehicle around said normal movement axis.

12. An indicator as in claim 11 further comprising additional segments for displaying numeric data.

13. An indicator as in claim 11 further comprising a glideslope height information display.

14. An indicator as in claim 11 further comprising a localizer deviation display.

15. An indicator as in claim 11 further comprising an approach speed display.

16. An indicator as in claim 11 further comprising a heading bearing display.

17. An indicator as in claim 11 further comprising a plurality of segments for indicating attitude correction commands.

18. An indicator as in claim 11 wherein said first multisegmented circle is formed having a first color, and said second multisegmented circle is formed having a second color.

19. An indicator as in claim 12 wherein said first multisegmented circle is formed having a first color, said second multisegmented circle is formed having a second color, and said segments for displaying numeric data are formed having a third color.

* * * * *